US007527499B2

(12) United States Patent
Schott

(10) Patent No.: US 7,527,499 B2
(45) Date of Patent: May 5, 2009

(54) AIRCRAFT FUSELAGE TRAINING DEVICE FOR FIRE FIGHTERS

(76) Inventor: Gary Schott, 13705 S. 18th St., Bellevue, NE (US) 68123

( * ) Notice: Subject to any disclaimer, the term of this patent is extended or adjusted under 35 U.S.C. 154(b) by 743 days.

(21) Appl. No.: 11/203,477

(22) Filed: Aug. 12, 2005

(65) Prior Publication Data

US 2006/0038072 A1 Feb. 23, 2006

Related U.S. Application Data

(60) Provisional application No. 60/602,286, filed on Aug. 17, 2004.

(51) Int. Cl.
*G09B 19/00* (2006.01)

(52) U.S. Cl. .................................................... 434/226

(58) Field of Classification Search .................. 434/29, 434/30, 32, 37, 51, 226; 446/34, 56, 60, 446/88

See application file for complete search history.

(56) References Cited

U.S. PATENT DOCUMENTS

| | | | | | |
|---|---|---|---|---|---|
| RE17,564 | E | * | 1/1930 | Schutte | 446/60 |
| 2,195,695 | A | * | 4/1940 | Brent | 446/34 |
| 3,140,846 | A | * | 7/1964 | Lott | 244/133 |
| 3,388,651 | A | * | 6/1968 | Axelrod | 446/34 |
| 4,204,358 | A | * | 5/1980 | Briggs | 446/57 |
| 4,997,688 | A | * | 3/1991 | Hardman | 428/34.9 |
| 5,145,439 | A | * | 9/1992 | Wagener | 446/34 |
| H1134 | H | * | 2/1993 | Meadows et al. | 434/226 |
| 5,415,551 | A | * | 5/1995 | Semenza | 434/226 |
| 5,688,136 | A | * | 11/1997 | Rogers et al. | 434/226 |
| 5,700,142 | A | * | 12/1997 | Miller et al. | 431/125 |
| 6,428,380 | B1 | * | 8/2002 | Murphy | 446/34 |

* cited by examiner

*Primary Examiner*—Kurt Fernstrom
(74) *Attorney, Agent, or Firm*—Stinson Morrison Hecker LLP

(57) ABSTRACT

An aircraft fuselage training device for training fire fighters to use fuselage penetration fire extinguishing devices includes a mounting frame and an aircraft fuselage simulation frame mounted on the mounting frame. At least one fuselage skin section sheet is releasably mounted on the aircraft fuselage simulation frame and the fuselage skin section sheet and the aircraft fuselage simulation frame are cooperatively operative to generally simulate an aircraft fuselage whereby fuselage penetration fire extinguishing devices are usable to penetrate the fuselage skin section sheet for firefighter training purposes.

15 Claims, 4 Drawing Sheets

AIRCRAFT FUSELAGE TRAINING DEVICE FOR FIRE FIGHTERS

CROSS-REFERENCE TO RELATED PROVISIONAL PATENT

This application claims priority based on a provisional patent, specifically on the Provisional Patent Application Ser. No. 60/602,286 filed Aug. 17, 2004.

BACKGROUND OF THE INVENTION

1. Technical Field

The present invention relates to training devices for fire fighters and, more particularly, to an aircraft fuselage simulation training device for fire fighters which includes at least one generally upright ground-mounted beam and a semi-cylindrical aircraft fuselage simulation frame mounted on and extending outwards from the ground-mounted beam, the aircraft fuselage simulation frame having a plurality of aluminum sheets mounted transversely thereon in general parallel alignment with the center longitudinal axis of the semi-cylindrical frame such that an aircraft fuselage is simulated for the fire fighters to use during training, particularly during training for use of aircraft skin penetration devices used in fire fighting.

2. Description of the Prior Art

Today's firefighters are equipped with many different types of specialized fire fighting devices for use in virtually any fire fighting situation. However, certain fire fighting situations require even more specialized equipment than others, and chief among these would be the situations encountered by those fire fighters who work at airports and must fight fires on, in, and around aircraft. Because of the confined space and limited access encountered in attempting to fight fires which are on aircraft, various specialized devices have been developed to permit the fire fighters to fight the fire without having to enter the aircraft. Among these are fuselage penetration devices such as the Snozzle® manufactured by Craft Rescue Equipment Service, Inc. of Dallas, Tex. Briefly, the Snozzle® is a water-delivery system which includes an aircraft skin penetration section having a metal piercing tip which is mounted on a truck-mounted boom which is connected to a water delivery system such as a pumping device. In operation, the Snozzle® would be extended through the outer wall of an aircraft until the forward end of the Snozzle® is within the aircraft. The water delivery system is then engaged and upwards of 300 gallons per minute are transferred through the Snozzle® into the interior of the aircraft without requiring the fire fighter to enter the dangerous interior of the aircraft. The Snozzle® system thus is designed to quickly and safely extinguish fires within the fuselage of the aircraft without requiring entry of the fuselage by a fire fighter.

One of the disadvantages, however, of the Snozzle® device is that it requires a good deal of practice to become proficient with the use of the Snozzle®. Clearly, it is impossible for a fire fighting unit in an airport to go around to various aircraft and stick the Snozzle® into the aircraft's skin to practice their technique, and there are very few other easily obtainable structures which provide an accurate simulation of the aircraft fuselage on which to practice. There is therefore a need for a training device for airport fire fighters which will permit them to practice the technique of penetrating the aircraft's skin with the Snozzle® in an accurate yet cost-effective manner. At the present time, no such training device exists.

Therefore, an object of the present invention is to provide an improved aircraft fuselage training device for firefighters.

Another object of the present invention is to provide an aircraft fuselage training device for firefighters which will permit firefighters to practice use of the aircraft skin penetration firefighting devices currently used by firefighters for putting out fires in airplanes.

Another object of the present invention is to provide an aircraft fuselage training device for firefighters which includes a generally upright ground-engaging frame on which is mounted a semi-cylindrical aircraft fuselage simulation frame on which a plurality of aluminum sheets are mounted thereon to simulate the outer skin and body of an aircraft fuselage.

Another object of the present invention is to provide an aircraft fuselage training device for firefighters which includes quick-release mounting devices for releasably securing the aluminum sheets on the aircraft fuselage simulation frame to permit the rapid removal and replacement of aluminum sheets to generally reduce interruptions in firefighting training.

Another object of the present invention is to provide an aircraft fuselage training device for firefighters which includes a full cylinder aircraft fuselage simulation frame having a plurality of aluminum sheets mounted on the outer circumference of the fuselage simulation frame to provide an accurate and useful training device for firefighters.

Finally, an object of the present invention is to provide an aircraft fuselage training device for firefighters which is relatively simple and durable in construction and is safe, efficient and effective in use.

SUMMARY OF THE INVENTION

The present invention provides an aircraft fuselage training device for training fire fighters to use fuselage penetration fire extinguishing devices which includes a mounting frame and an at least partially cylindrical aircraft fuselage simulation frame mounted on the mounting frame. At least one fuselage skin section sheet is releasably mounted on the aircraft fuselage simulation frame and the at least one fuselage skin section sheet and the aircraft fuselage simulation frame are cooperatively operative to generally simulate an aircraft fuselage whereby fuselage penetration fire extinguishing devices are usable to penetrate the at least one fuselage skin section sheet for training purposes.

The present invention further includes a method of training fire fighters in the use of fuselage penetration fire extinguishing devices which includes the steps of providing a mounting frame, an at least partially cylindrical aircraft fuselage simulation frame mounted on the mounting frame and at least two fuselage skin section sheets releasably mounted on the aircraft fuselage simulation frame. A fuselage penetration fire extinguishing device is also provided which includes a metal piercing tip operative to extend into and through the at least two fuselage skin section sheets releasably mounted on the aircraft fuselage simulation frame. The fuselage penetration fire extinguishing device is then engaged to move the metal piercing tip into and through a selected one of the at least two fuselage skin section sheets and the engaging step is then repeated in one of a different location on the selected one of the at least two fuselage skin section sheets and a second one of the at least two fuselage skin section sheets thereby practicing use of the fuselage penetration fire extinguishing device to gain competence in the use thereof.

The aircraft fuselage training device for firefighters as described above provides numerous advantages for firefighter training which are not found in many of the training devices and methods found in the prior art. For example, because the aluminum sheets mounted on the semi-cylindrical aircraft fuselage simulation frame generally replicate the position and penetration resistance of a real aircraft fuselage, firefighters training with penetration firefighting devices can accurately simulate the specific procedures required to properly fight fires within aircraft, without having to actually use the penetration firefighting devices on an actual aircraft. Furthermore, because the aluminum sheets are relatively inexpensive and may be quickly and easily replaced on the aircraft fuselage simulation frame, an increased amount of training is permitted without having to use different locations on the fuselage which have not yet been penetrated. The correct procedure for extinguishing fires within an aircraft may thus be practiced, without having to make concessions to the previously available inadequate simulation devices. Finally, because the positioning of the aircraft fuselage simulation frame on the ground-engaging upright frame may be adjusted, the heights and angles required for penetration of various types of aircraft may be practiced while using the same aircraft fuselage simulation training device of the present invention, instead of having to have available examples of each and every aircraft which might be encountered at an air field. The aircraft fuselage training device for firefighters of the present invention thus provides a substantial improvement over those devices and methods found in the prior art.

DESCRIPTION OF THE PREFERRED EMBODIMENT

Figure 1:
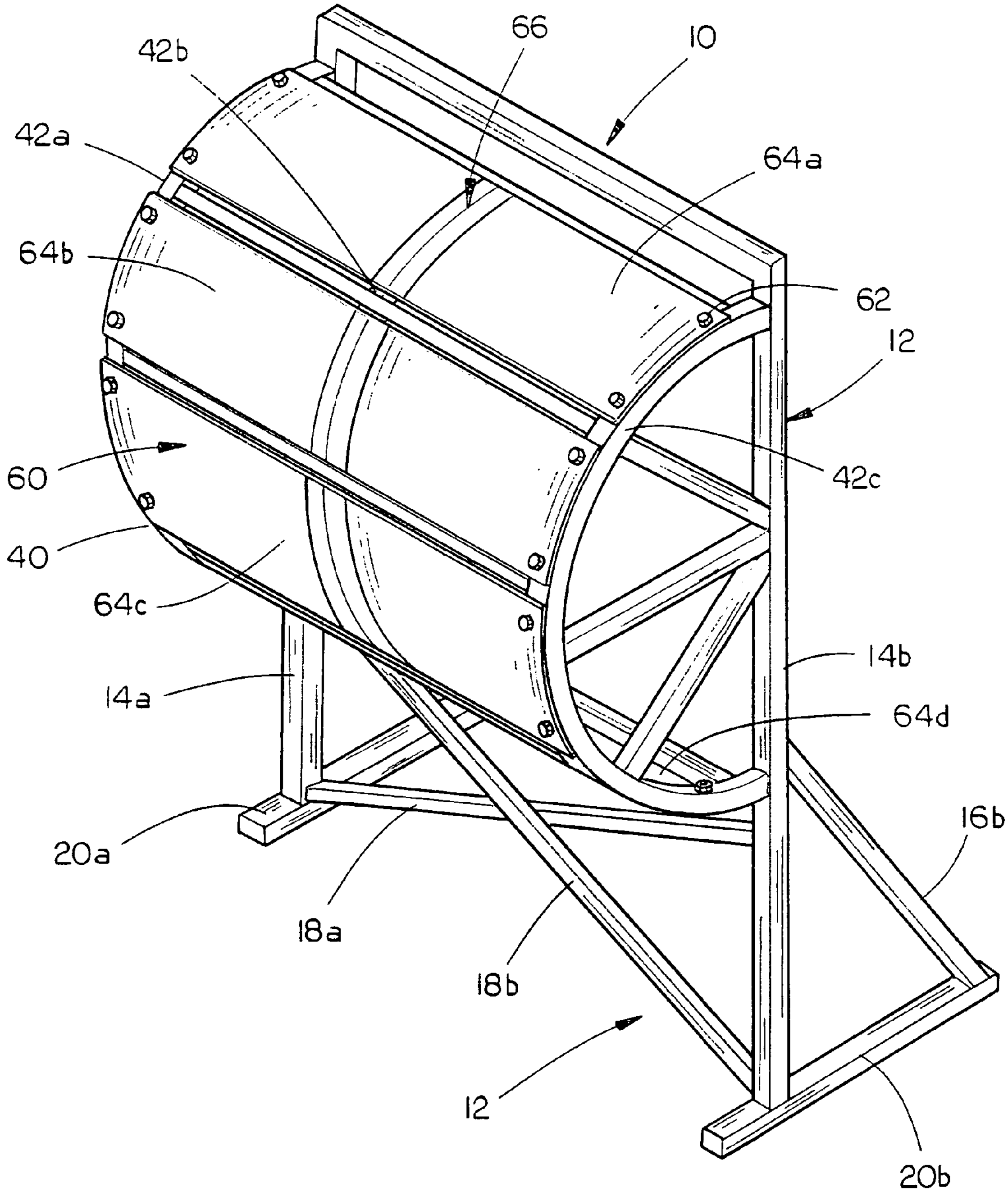
FIG. 1 is a perspective view of the aircraft fuselage training device for fire fighters of the present invention.
Figure 2:
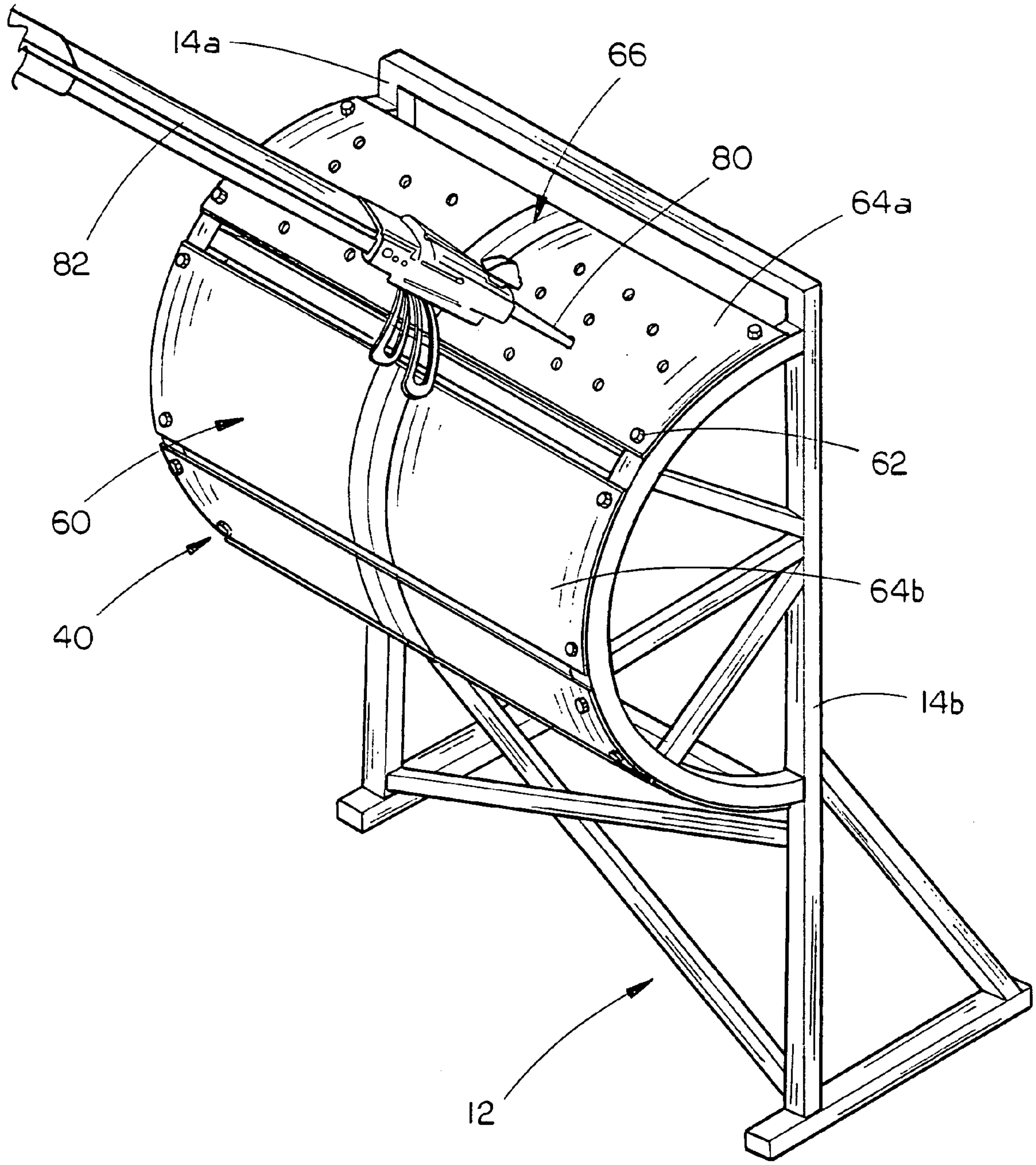
FIG. 2 is a perspective view of the aircraft fuselage training device for fire fighters showing the device in use during training.
Figure 3:
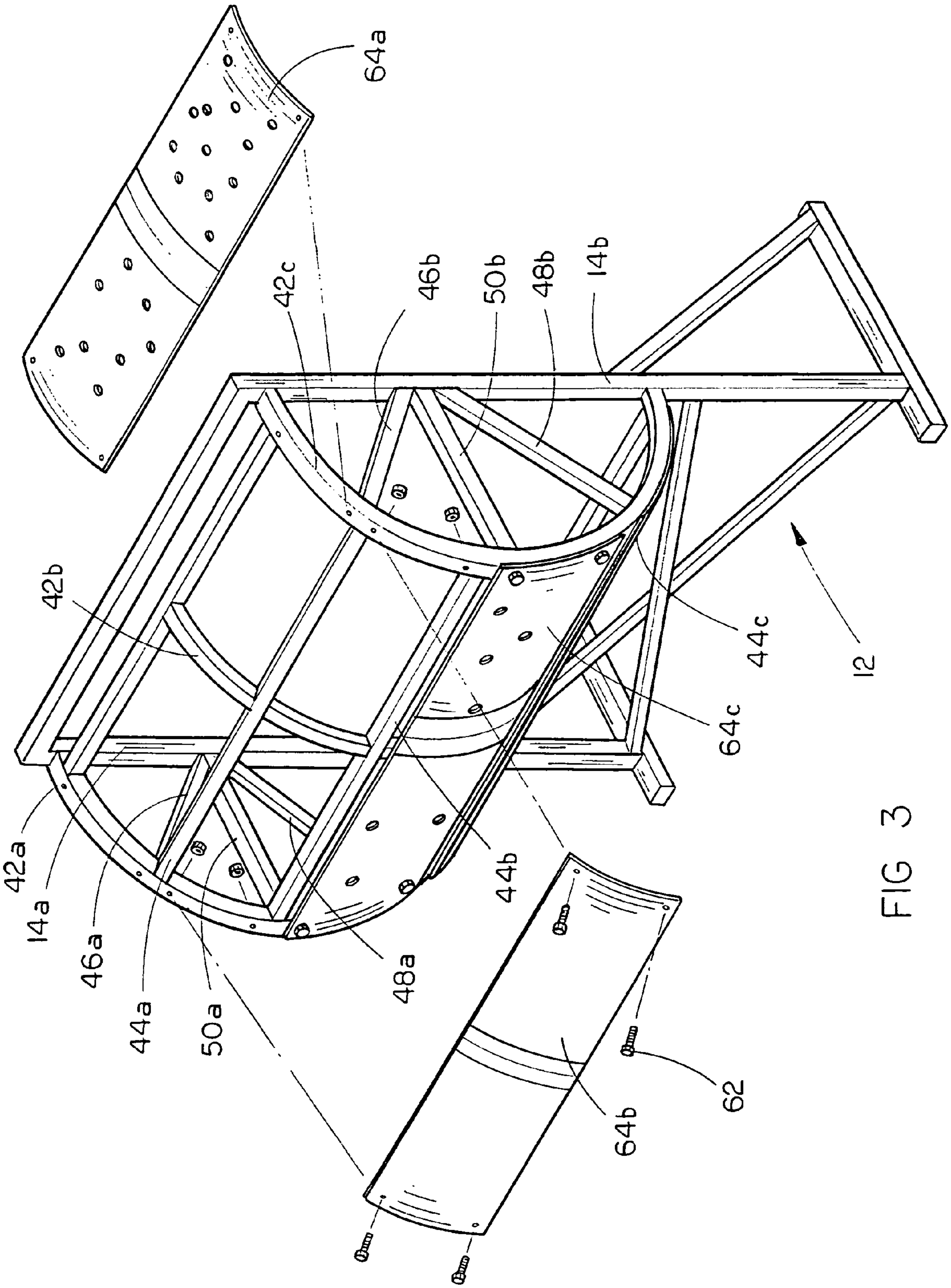
FIG. 3 is a perspective view of the present invention showing one of the aluminum panels being replaced after use.

The aircraft fuselage training device 10 for fire fighters of the present invention is shown best in FIGS. 1-3 as including a generally upright mounting frame section 12 and an aircraft fuselage simulation frame section 40 which is mounted on the generally upright mounting frame section 12. In the preferred embodiment, generally upright mounting frame section 12 would include a pair of upright main frame beams 14*a* and 14*b* which extend upwards generally parallel to one another and are spaced approximately 4 to 6 feet apart. Main frame beams 14*a* and 14*b* would be securely mounted on a foundation 30 which, in the preferred embodiment, would likely be a pair of concrete footings or another such extremely sturdy and solid mounting foundation for the main frame beams 14*a* and 14*b*. While it is expected that foundation 30 will provide sufficient vertical force stability for the main frame beams 14*a* and 14*b*, it may be preferable to provide additional horizontal force support for each of the main frame beams 14*a* and 14*b*, and therefore a pair of generally diagonal main frame support struts 16*a* and 16*b* would be mounted to the main frame beams 14*a* and 14*b*, as shown best in FIGS. 1 and 2, with the main frame support struts 16*a* and 16*b* extending downwards to be secured to the foundation 30 to generally prevent horizontal movement of the main frame beams 14*a* and 14*b* in response to horizontal forces being applied thereto. In the preferred embodiment, the main frame beams 14*a* and 14*b* and main frame support struts 16*a* and 16*b* would be constructed of heavy-duty steel I-beams, and the main frame beams 14*a* and 14*b* would have heights of approximately 10 to 16 feet. Additional features which may be found on the generally upright mounting frame section 12 may include one or more spacing struts 18 which extend between and connect main frame beams 14*a* and 14*b* for additional structural stability of the mounting frame section 12, although the inclusion of such spacing struts is not critical to the present invention. Also, it may be preferable to mount the main frame beams 14*a* and 14*b* and main frame support struts 16*a* and 16*b* to a respective one of a pair of base beams 20*a* and 20*b* instead of being mounted to the foundation 30 directly, and such modifications would be understood by one skilled in the art of metal fabrication and foundation construction.

The aircraft fuselage simulation frame section 40 is shown best in FIGS. 1-3 as including three generally semi-cylindrical fuselage frame bars 42*a*, 42*b*, and 42*c*, each of which extend from generally adjacent the topmost portion of main frame beams 14*a* and 14*b* outwards, downwards, and inwards to connect to the main frame beams 14*a* and 14*b*, and cross braces 18 at a point approximately 6 to 12 feet below the topmost portion of main frame beams 14*a* and 14*b*. Extending generally perpendicular to and connecting each of the fuselage frame bars 42*a-c* are a plurality of fuselage frame cross beams 44*a*, 44*b*, and 44*c* which provide additional structural stability to the fuselage frame bars 42*a-c*, as shown best in FIGS. 1-3. Also, to provide additional structural stability for the aircraft fuselage simulation frame section 40, each of the outer fuselage frame bars 42*a* and 42*c* would be further connected to the adjacent main frame beam 14*a* and 14*b* by upper and lower diagonal support struts 46*a*, 46*b*, 48*a*, and 48*b* and middle frame bar support strut 50*a* and 50*b*, which extend generally horizontally between the outermost section of the fuselage frame bar 42*a* and 42*c* and the adjacent main frame beam 14*a* and 14*b*. Of course, it is preferred that each of the frame elements of the mounting frame section 12 and aircraft fuselage simulation frame section 40 be connected to one another via welding or the like in order to ensure that the resulting frame is extremely sturdy and able to withstand the forces that will be applied to it. Also, it is expected that the length of the circumference of fuselage frame bars 42*a-c* would be approximately 10 to 20 feet, depending on the desired size for the trainer and the intended use thereof.

The remaining major section of the aircraft fuselage training device 10 for fire fighters of the present invention is shown best in FIGS. 1-3 and includes the aircraft fuselage simulation skin 60 and mounting devices 62 therefor which permit the skin 60 to be mounted on the aircraft fuselage simulation frame section 40 and specifically on fuselage frame bars 42*a-c*. In the preferred embodiment, the fuselage skin 60 would consist of four (4) generally rectangular skin sections 64*a*, 64*b*, 64*c* and 64*d*, which would be mounted on the outer circumference of the fuselage frame bars 42*a-c* with small gaps between each of the skin sections 64*a-d*, as shown best in FIGS. 2 and 3, which may generally align with the fuselage frame cross beams 44*a*, 44*b*, and 44*c* so that the user of the present invention can see the location of each of the fuselage frame cross beams 44*a*, 44*b*, and 44*c* to prevent unintentional damage thereto. It is preferred that each of the fuselage skin sections 64*a-d* be constructed of aluminum which is similar in thickness to the thickness of the actual aluminum skin used in connection with aircraft fuselages in order to provide a very accurate and reliable simulation of the actual act of penetration of an aircraft fuselage. In the preferred embodiment, each of the fuselage skin sections 64*a-d* would have a width of approximately the same width as the fuselage simulation frame section 40 and a height of approximately 2 to 5 feet, which will generally be determined by the size of the aircraft fuselage training device 10 and the circumference of the fuselage frame bars 42*a-c*. In any event, it is preferred that the fuselage skin 60 be comprised of at least three separate fuselage skin sections 64*a-d* so that the use of any one of the fuselage skin sections 64*a-d* during training will not require the entire fuselage skin 60 to be replaced to permit continued practice of the penetration process.

Regarding the mounting devices 62, it is expected that any number of different mounting devices, such as bolts and nuts or quick mount fasteners, may be used with the fuselage skin 60 of the present invention so long as the mounting devices 62 are relatively simple to use and safely secure the fuselage skin 60 to the fuselage frame bars 42*a-c*. It is expected, however, that some type of quick-mount mounting device will be used with the aircraft fuselage training device 10 of the present invention in order to permit a user of the present invention to quickly and easily swap fuselage skin sections 64*a-d* to permit continued training on the device.

To ensure that a user of the present invention does not penetrate the fuselage skin sections 64*a-d* over the center fuselage frame bar 42*b*, it is preferable to use some sort of marking indicia such as a center marking tape 66 which would be affixed to the fuselage skin section 64*a-d* and would extend in generally parallel alignment with the fuselage frame bar 42*b* when the fuselage skin section 64*a-d* is mounted on the aircraft fuselage simulation frame section 40. Of course, other marking devices may be used to highlight the center fuselage frame bar 42*b*, any of which would be usable in connection with the present invention so long as the functional features of the aircraft fuselage simulation device 10 are neither degraded nor destroyed.

The aircraft fuselage training device 10 of the present invention is shown in use in FIG. 2. Specifically, a user of the device would approach the device with the Snozzle® 80 and by moving the boom 82 forward on which the Snozzle® 80 is mounted, would penetrate one of the fuselage skin sections 64*b* with the Snozzle® 80 and would then engage the water delivery system for the Snozzle® 80 to spray water within the aircraft fuselage simulation frame section 40. Because of the thickness of the fuselage skin sections 64*a-d*, the amount of force required to penetrate the fuselage skin section 64*b* with the Snozzle® 80 is very similar to the amount of force needed for the Snozzle® 80 to penetrate an actual aircraft fuselage, and therefore the fire fighting crews will increase their confidence and become more and more proficient with repeated piercing training as exhibited in FIG. 2.

Another advantage of the present invention is that the size of the fuselage skin sections 64*a-d* permit the users of the aircraft fuselage training device 10 to perform many penetrations of the fuselage skin section 64*a-d* before the fuselage skin section 64*a-d* must be replaced. However, a further advantage of the present invention is that when one of the fuselage skin sections 64*b* needs to be replaced due to its having been penetrated numerous times, the user merely accesses the mounting device 62 and removes the used fuselage skin section 64*b* and replaces it with either a new fuselage skin section or he or she may move one of the other fuselage skin sections 64*d* upwards to replace the removed fuselage skin section 64*b*. Also, because the fuselage skin sections 64*a-d* are relatively inexpensive, the fire fighters that are training with the aircraft fuselage training device 10 of the present invention may conduct numerous training sessions for a relatively low price, thus substantially increasing their proficiency and rendering it more likely they will be able to perform the penetration process on an actual aircraft if and when the time comes where such penetration is necessary.

Figure 4:
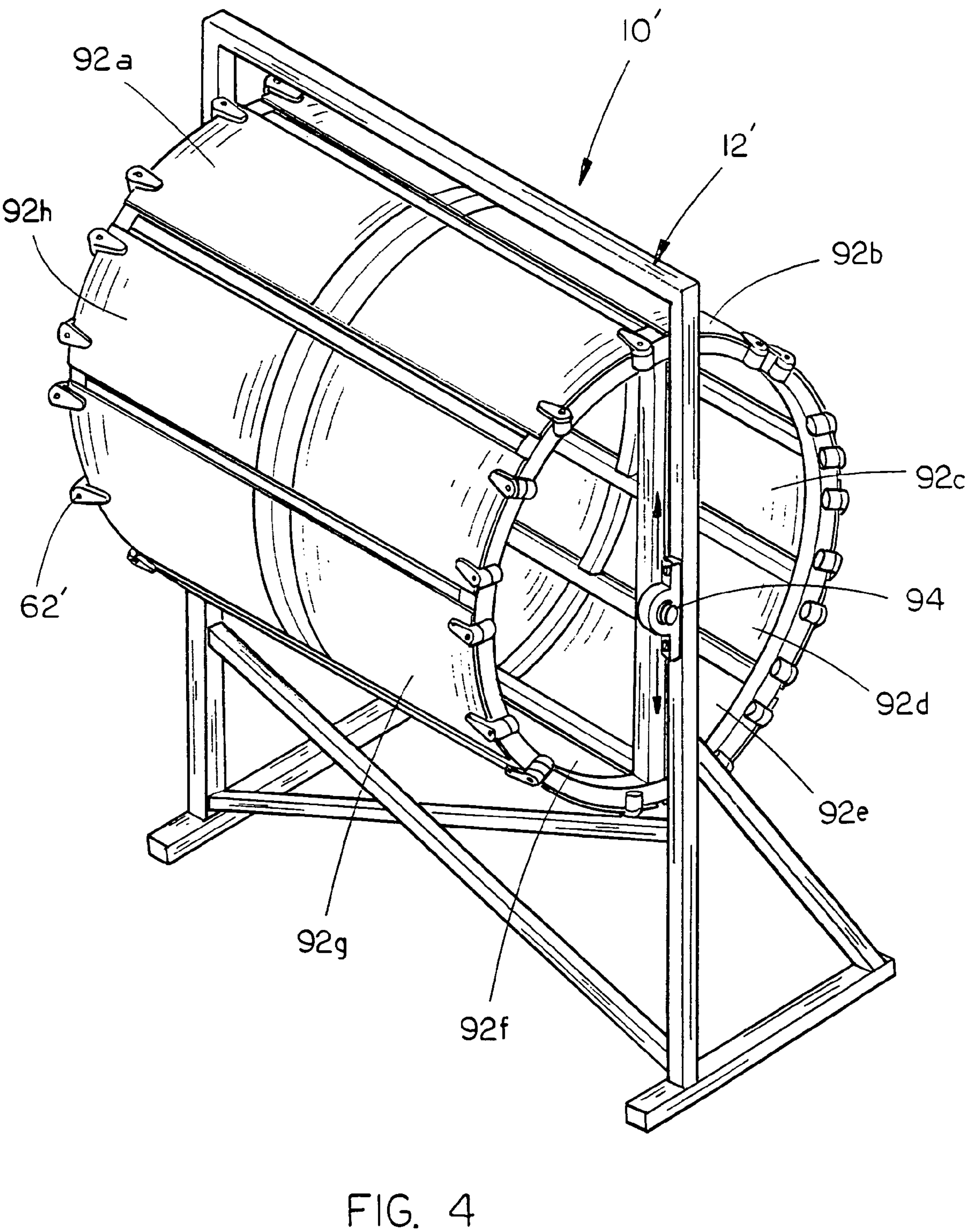
FIG. 4 is a perspective view of an alternative embodiment of the aircraft fuselage training device for fire fighters of the present invention.

An alternative embodiment of the present invention is shown in FIG. 4 as including a generally upright mounting frame section 12' and an aircraft fuselage simulation frame section 40', similar to those shown in connection with the preferred embodiment of FIGS. 1-3. However, in the embodiment of FIG. 4, the aircraft fuselage simulation frame section 40' would include a full cylinder design which includes a full cylinder fuselage section 90 on which the fuselage skin sections 92*a*, 92*b*, 92*c*, 92*d*, 92*e*, 92*f*, 92*g*, and 92*h* are mounted. It has been found that for some training exercises, the use of the full cylinder fuselage section 90 is preferable to the aircraft fuselage simulation frame section 40 in that 360 degree access to the full cylinder fuselage section 90 on the aircraft fuselage training device 10' is prevented. This feature enables the user of the present invention to train for additional eventualities such as simultaneous penetration of the aircraft fuselage by multiple Snozzle® devices, as may be necessary in the event of extreme fire situations. It should be noted, however, that the mounting of fuselage skin sections 92*a-h* to the full cylinder fuselage section 90 would likely be accomplished using mounting devices 62' similar to those described previously and therefore the functionality of the second embodiment of the aircraft fuselage training device 10' would be similar to that described in connection with the preferred embodiment of aircraft fuselage training device 10 shown in FIGS. 1-3.

Also, as shown on FIG. 4, it is preferred that the aircraft fuselage simulation frame section 40' be movably mounted on the generally upright mounting frame section 12' such that vertical movement of the aircraft fuselage simulation frame section 40' relative to the generally upright mounting frame section 12' is permitted. The up and down arrows shown in FIG. 4 illustrate the preferred movement of the aircraft fuselage simulation frame section 40' relative to the generally upright mounting frame section 12' and it should be noted that the aircraft fuselage training device 10 shown in FIGS. 1-3 may also include such vertical adjustment capability. The specific nature of the vertical adjustment capability is not critical to the present invention so long as the functional capabilities are neither degraded nor destroyed. It has also been found that the providing of such vertical adjustment capability broadens the usefulness of the present invention and permits the aircraft fuselage training device 10 to be used to replicate a broader range of aircraft and fuselage types.

The advantages of the aircraft fuselage training device 10 of the present invention are therefore clear, and include the fact that aircraft and airport fire fighting crews now have the opportunity to hone their skills when using penetration tools without damaging the penetration devices or aircraft during training. Also, because the curvature of the aircraft fuselage simulation frame section 40 and therefore the fuselage skin 60 is similar to that of an actual aircraft fuselage, the crew undergoing training will feel confident that their training is an accurate representation of the actual penetration process. Finally, because the fuselage skin sections 64*a-d* may be quickly and easily replaced, the fire fighter's training may proceed without significant interruption. When using any of those devices found in the prior art, significant interruptions are par for the course.

It is to be noted that numerous additions, modifications, and substitutions may be made to the aircraft fuselage training device 10 of the present invention which fall within the intended broad scope of the above description. For example, the specific size, shape and construction materials used in connection with the generally upright mounting frame section 12 and aircraft fuselage simulation frame section 40 are not critical so long as the intended functionality of the present invention is neither degraded nor destroyed. Also, although the fuselage skin 60 of the present invention has been described as including several rectangular panels, it should be noted that the specific size and shape of the fuselage skin sections 64*a-d* may be modified so long as the fuselage skin 60 provides an accurate and easily used representation of an aircraft fuselage. Finally, although the mounting devices 62 have been described with some degree of particularity, it should be noted that numerous other types of mounting devices may be used to connect the fuselage skin sections 64*a-d* to the fuselage frame bars 42*a-c*, any of which would be understood by one skilled in the art of affixing metal panels to an underlying frame.

There has therefore been shown and described an aircraft fuselage training device 10 for fire fighters which accomplishes at least all of its intended objectives.

I claim:

1. An aircraft fuselage training device for training fire fighters to use fuselage penetration fire extinguishing devices comprising:

a mounting frame;

an at least partially cylindrical aircraft fuselage simulation frame mounted on said mounting frame;

at least one fuselage skin section sheet releasably mounted on said aircraft fuselage simulation frame, said skin section sheet being formed from a material providing an accurate representation of an aircraft fuselage;

said at least one fuselage skin section sheet and said aircraft fuselage simulation frame being cooperatively operative to generally simulate an aircraft fuselage to be penetrated for training purposes.

2. The aircraft fuselage training device of claim 1 wherein said mounting frame further comprises a pair of upright main frame beams which extend upwards generally parallel to one another.

3. The aircraft fuselage training device of claim 2 wherein said pair of upright main frame beams are securely mounted on a ground-mounted foundation.

4. The aircraft fuselage training device of claim 2 wherein said aircraft fuselage simulation frame further comprises at least two generally semi-cylindrical fuselage frame bars, each of which extends from generally adjacent the topmost portion of a respective one of said pair of main frame beams outwards, downwards, and inwards to connect to the same respective one of said pair of main frame beams to form said aircraft fuselage simulation frame.

5. The aircraft fuselage training device of claim 3 further comprising at least two fuselage skin section sheets constructed of aluminums each having a thickness approximately equal to the thickness of an aluminum skin used in connection with aircraft fuselages whereby an accurate and reliable simulation of an actual act of penetration of an aircraft fuselage is provided.

6. The aircraft fuselage training device of claim 1 further comprising a plurality of mounting devices mounted on said aircraft fuselage simulation frame, said plurality of mounting devices being operative to releasably secure said at least one fuselage skin section sheet on said aircraft fuselage simulation frame.

7. The aircraft fuselage training device of claim 5 further comprising a plurality of quick-mount mounting devices mounted on said aircraft fuselage simulation frame, said plurality of quick-mount mounting devices being operative to releasably secure said at least two fuselage skin section sheets on said aircraft fuselage simulation frame thereby facilitating swapping of a penetrated fuselage skin section for another fuselage skin section.

8. The aircraft fuselage training device of claim 1 wherein said aircraft fuselage simulation frame is a full cylinder with a plurality of said fuselage skin section sheets extending around and generally covering the outer circumference of said aircraft fuselage simulation frame.

9. The aircraft fuselage training device of claim 1 wherein said aircraft fuselage simulation frame is height-adjustably mounted on said mounting frame such that the height of said aircraft fuselage simulation frame is adjustable relative to said mounting frame and the ground surface on which said mounting frame is resting.

10. An aircraft fuselage training device for training fire fighters to use fuselage penetration fire extinguishing devices comprising:

a mounting frame having a pair of upright main frame beams which extend upwards generally parallel to one another;

a semi-cylindrical aircraft fuselage simulation frame mounted on said mounting frame, said aircraft fuselage simulation frame including at least two generally semi-cylindrical fuselage frame bars, each of which extends from generally adjacent the topmost portion of a respective one of said pair of main frame beams outwards, downwards, and inwards to connect to the same respective one of said pair of main frame beams to form said aircraft fuselage simulation frame;

at least two fuselage skin section sheets releasably mounted on said at least two generally semi-cylindrical fuselage frame bars of said aircraft fuselage simulation frame;

said at least two fuselage skin section sheets and said aircraft fuselage simulation frame being cooperatively operative to generally simulate an aircraft fuselage to be penetrated for training purposes.

11. The aircraft fuselage training device of claim 10 wherein said at least two fuselage skin section sheets are constructed of aluminum each having a thickness approximately equal to the thickness of an aluminum skin used in connection with aircraft fuselages whereby an accurate and reliable simulation of the actual act of penetration of an aircraft fuselage is provided.

12. The aircraft fuselage training device of claim 10 further comprising a plurality of mounting devices mounted on said aircraft fuselage simulation frame, said plurality of mounting devices operative to releasably secure said at least two fuselage skin section sheets on said aircraft fuselage simulation frame.

13. The aircraft fuselage training device of claim 10 further comprising a plurality of quick-mount mounting devices mounted on said aircraft fuselage simulation frame, said plurality of quick-mount mounting devices operative to releasably secure said at least two fuselage skin section sheets on said aircraft fuselage simulation frame thereby facilitating swapping of a penetrated fuselage skin section for another fuselage skin section.

14. The aircraft fuselage training device of claim 10 wherein said aircraft fuselage simulation frame is height-adjustably mounted on said mounting frame such that the height of said aircraft fuselage simulation frame is adjustable relative to said mounting frame and the ground surface on which said mounting frame is resting.

15. A method of training fire fighters in the use of fuselage penetration fire extinguishing devices and forceable entry tools comprising the steps:

providing a mounting frame, an at least partially cylindrical aircraft fuselage simulation frame mounted on said mounting frame and at least two fuselage skin section sheets releasably mounted on said aircraft fuselage simulation frame;

providing at least one of a forceable entry tool and a fuselage penetration fire extinguishing device each operative to extend into and through a selected one of said at least two fuselage skin section sheets releasably mounted on said aircraft fuselage simulation frame;

engaging said at least one of said forceable entry tool and said fuselage penetration fire extinguishing device to extend into and through a selected one of said at least two fuselage skin section sheets; and repeating said engaging step in one of a different location on said selected one of said at least two fuselage skin section sheets and a second one of said at least two fuselage skin section sheets thereby practicing use of at least one of said forceable entry tool and said fuselage penetration fire extinguishing device to gain competence in the use thereof.

* * * * *